United States Patent [19]

Potts

[11] Patent Number: 4,856,324
[45] Date of Patent: Aug. 15, 1989

[54] HIGH SPEED TIRE TESTING DEVICE WITH COMPENSATED LINKAGES

[76] Inventor: Gerald R. Potts, G-6235 Corunna Rd., Flint, Mich. 48532

[21] Appl. No.: 171,086

[22] Filed: Mar. 21, 1988

[51] Int. Cl.$^4$ .......................................... G01M 17/02
[52] U.S. Cl. ..................................................... 73/146
[58] Field of Search .................................. 73/146, 7, 8

[56] References Cited

U.S. PATENT DOCUMENTS

| | | | |
|---|---|---|---|
| 3,937,076 | 2/1976 | Pommellett et al. | 73/146 |
| 4,160,378 | 7/1979 | Himmler | 73/146 |
| 4,344,325 | 8/1982 | Iwama | 73/146 |

Primary Examiner—Donald O. Woodiel
Attorney, Agent, or Firm—Dykema Gossett

[57] ABSTRACT

A tire testing device which is constructed to compensate for the elastic deformation that occurs in the structural components supporting a test tire when the test tire is loaded against a roadwheel. The present construction also prevents mechanical resonances in the tire load frame during high frequency testing which permits undistorted measurements of higher harmonic force variation from the tire. The test tire is mounted to a rotatable spindle within a housing for selective engagement with a roadwheel. The housing is supported and maneuvered by a plurality of vertical and horizontal members, each member including universal joints at its opposite ends. The horizontal members are arranged in a trapezoidal or nonparallel configuration such that a small acute angle is formed between the outer surface of the test tire and the outer surface of the roadwheel when the test tire is drawn against the roadwheel. The nonparallel configuration of the support members provides more precamber with large, heavily loaded tires and less precamber for small, lightly loaded tires to compensate for the variations in elastic deformation.

6 Claims, 2 Drawing Sheets

HIGH SPEED TIRE TESTING DEVICE WITH COMPENSATED LINKAGES

BACKGROUND OF THE INVENTION

The present invention relates to a high speed tire testing device which is constructed with linkages to compensate for the elastic deformation of the structural components supporting the tire.

In the prior art, there are a number of tire testing machines of various kinds such as shown in U.S. Pat. Nos. 3,060,734, 3,206,973, 3,543,576, 3,546,936, 3,604,245 and 3,797,306. These devices typically include large frames that are required for moving the tire into position against a testing wheel. Such cumbersome mechanisms increase the cost of construction and make installation and servicing difficult. None of these devices provide an efficient, relatively lightweight and accurate tire testing apparatus that can be easily instrumented to provide for an analysis of all of the required loads and movements necessary for tire compliance testing.

Tire uniformity measurements are primarily associated with an assessment of the radial, fore/aft, and lateral force variations to be expected at the center of a tire rolling at a constant loaded radius, with aligning, overturning, and rolling resistance moments being of secondary importance. The need for tire uniformity measurements arose from the fact that the tire can be an exciter of vehicle vibrations. Previously, this sensitivity was mostly related to the first harmonic of the tire's non-uniformity. This first harmonic sensitivity feels very much like tire unbalance, having a once-per-tire revolution excitation rate.

The force variation signals from a tire can be decomposed into a series of sinusoidal components wherein the component having one cyclic variation per tire revolution being called the first harmonic, that with two complete cycles per tire revolution being called the second harmonic, etc. When one of these harmonics excites a resonant mode of vehicle vibration, a noticeable disturbance may be felt inside the vehicle. Since the first harmonic force typically has the large peak-to-peak amplitude, that harmonic is usually the most noticeable. However, the higher harmonics become noticeable in the form of beating together, i.e., interfering and reinforcing one another. Nevertheless, typical tire uniformity measurements in the prior art have only included the first harmonic peak-to-peak values for the radial and lateral force variation signals from the tire since it was believed that low speed measurement of these quantities provided the necessary correlation to ride comfort ratings.

With the ever-increasing use of radial tires, which have lower resonant frequencies than bias ply tires, it has become important to measure higher harmonic excitations because of the disturbances caused by these higher harmonics. A problem existed, however, because prior devices are not able to readily assess the disturbances produced by the higher harmonics. Moreover, the smaller and lighter vehicles being produced today with unibody construction are generally more sensitive to these higher harmonics, thereby producing an even greater need for such measurements.

Applicant's prior invention as embodied in U.S. Pat. No. 4,691,564, provides a high speed tire uniformity testing machine which is constructed such that no mechanical resonances exist within the measurement frequency range of approximately 1–200 Hz, thereby permitting the measurement of both higher harmonic excitation rates and increased fore/aft non-uniformity forces that increase with tire speed. Thus, the problem of prior devices not being able to readily assess the disturbances produced by the higher harmonics has been solved. However, another problem can arise with a relatively lightweight tire testing apparatus of this type. During the loading of a tire against a road wheel, the elastic deformation of the structural components supporting the tire may deflect to an extent that established machine alignment specifications cannot be met. Established specifications require parallel alignment between the tire and roadwheel shafts when loaded, and therefore, if either shaft deforms elastically during loading, such specifications cannot be met unless there is an appropriate compensation. Since the elastic deformation typically occurs in the tire shaft, there exists a need to compensate for that deformation.

Therefore, it is the object of the present invention to provide a high speed tire testing device which will compensate for the elastic deformation of the structural components that support the tire during the loading of the tire against a roadwheel.

SUMMARY OF THE INVENTION

The present invention provides a tire testing machine which presents the tire to the roadwheel surface in a precambered configuration so that the elastic deformation of the structural components during loading of the tire against the roadwheel causes a proper alignment of the tire and roadwheel shafts. This is accomplished by configuring the support links for the structural component supporting the tire in a trapezoidal configuration such that the instant center of rotation of the support links is on the open face side of the tire. The trapezoidal configuration of the support links provides less precamber for small, lightly loaded tires and more precamber for large, heavily loaded tires to compensate for the differences in elastic deformation due to variable loading conditions. The consequent rotational motion of the carriage is permitted by the spherical universal joints in the vertical tie rods, which move together in a helical or twisting pattern during loading and unloading of the tire.

The main support base for the tire testing machine includes opposed vertical frames for rotatably supporting an axle of a roadwheel. The roadwheel is driven by a drive motor which is operably connected thereto. A test tire is mounted to a rotatable spindle on a housing for selective engagement with the roadwheel. The housing is supported by a plurality of vertical tie rods and horizontal tie rods with each tie rod including universal joints at its opposite ends. The test tire is drawn against or disengaged from the roadwheel by means of a linear actuator which is connected to the housing by yet another universal joint.

The horizontal tie rods are placed in a trapezoidal configuration for precambering the tire as it is presented to the roadwheel surface. This produces a proper alignment of the machine components, i.e., the tire and roadwheel shafts, under loaded conditions. Further, the tire rods provide for maximum stiffness when the tire is rotatably engaged against the roadwheel because the universal joint connections prevent the application of bending moments to the tie rods, and therefore, only tension and compression forces are applied. Load cells are connected to the tie rods and linear actuator for the purpose of measuring tension or compression variations along the connecting links to the housing due to the rolling engagement between the test tire and roadwheel. Significantly, the very stiff load frame assures that no mechanical resonances will exist within the intended test frequency range, thereby permitting undistorted measurements of higher harmonics in the test tire.

Other advantages and meritorious features of the present invention will be more fully understood from the following description of the invention, the appended claims, and the drawings, a brief description of which follows.

DETAILED DESCRIPTION OF THE INVENTION

Figure 1:
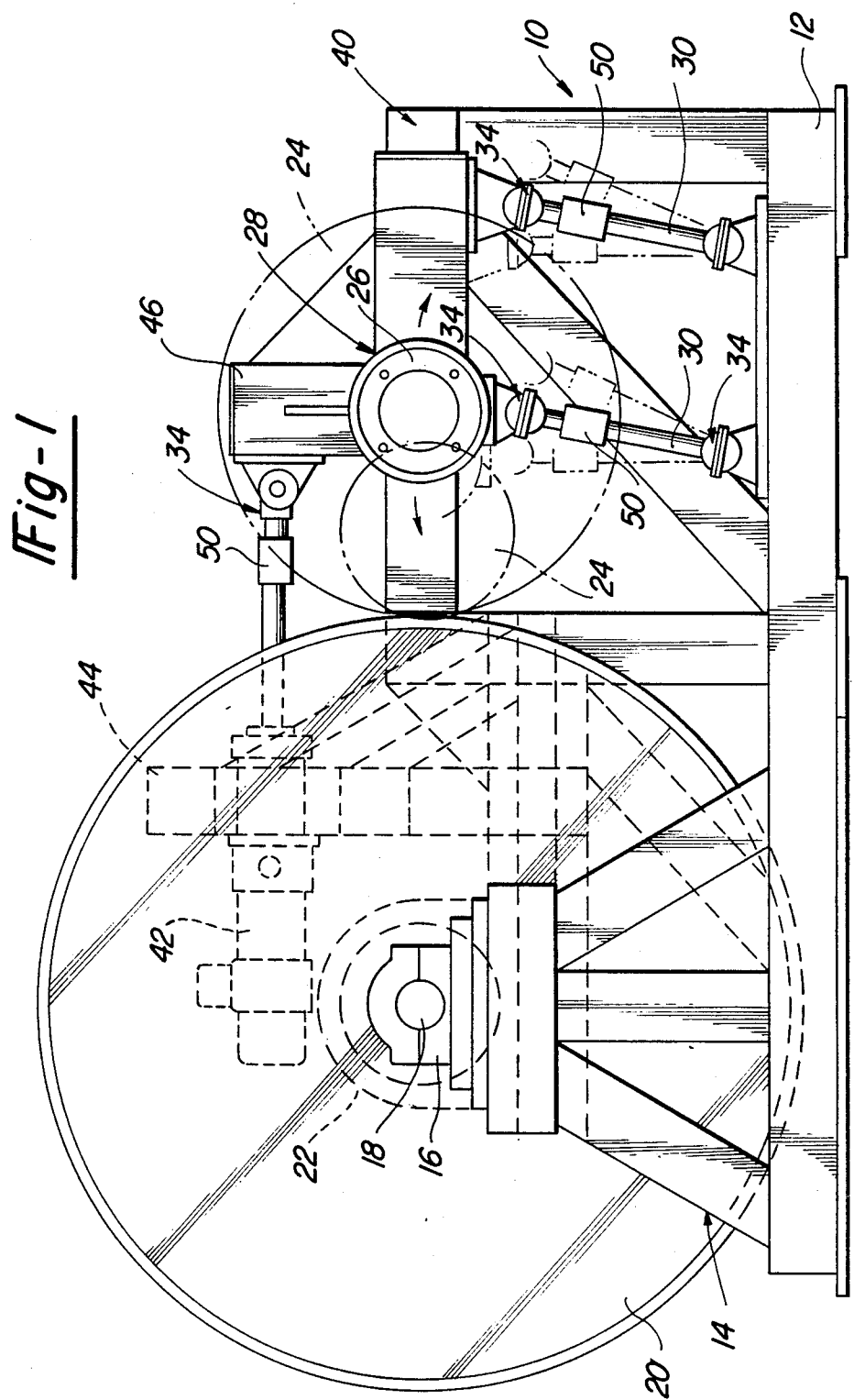
FIG. 1 is a side elevational view of the high speed tire testing device of the present invention.
Figure 2:
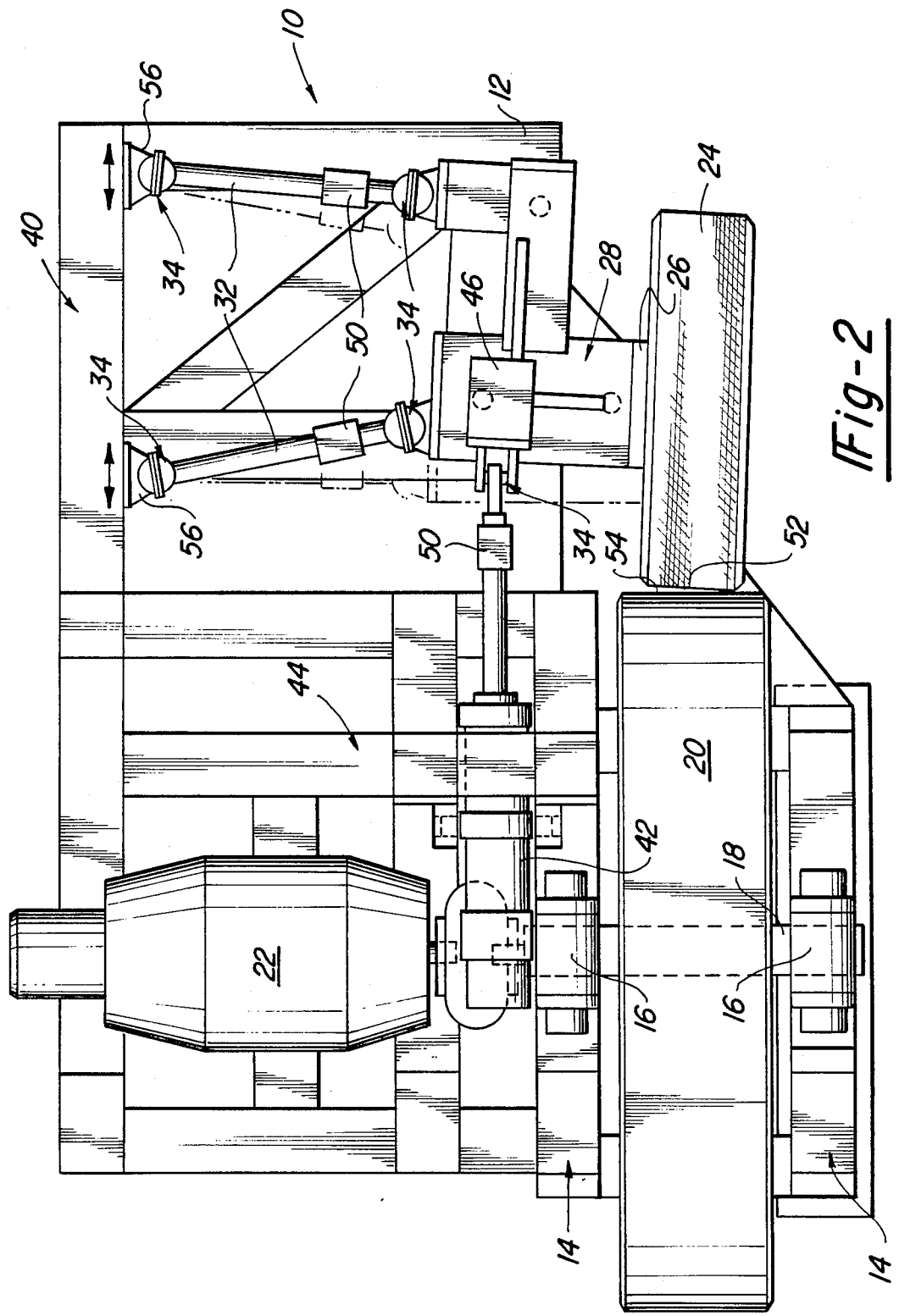
FIG. 2 is a top plan view of the tire testing device.

A high speed tire testing machine 10 made in accordance with the principles of the present invention is disclosed in FIGS. 1-2. A main support base 12 includes opposed vertical support frames 14 having bushings 16 on their upper ends for rotatably supporting an axle 18 for a roadwheel 20. The roadwheel 20 is driven by a motor 22 which is operably connected to axle 18.

A test tire 24 is mounted to a rotatable spindle 26 within housing 28 for selective engagement with roadwheel 20. Housing 28 is supported by a plurality of vertical tie rods 30 and horizontal tie rods 32. As disclosed, the tie rods 30 and 32 include universal joints 34 at their opposite ends, each comprising spherical bearing members. Each of the vertical tie rods 30 is connected by the universal joints 34 between the underside of housing 28 and main support base 12. Each of the horizontal tie rods 32 is connected by the universal joints 34 between a side of housing 28 and vertical support structure 40 extending upwardly from support base 12.

Test tire 24 is drawn against or disengaged from roadwheel 20 by means of a linear actuator 42 that is mounted to support structure 44 at its cylinder end. Actuator 42 is connected at its piston end to a vertically protruding portion 46 of housing 28 by yet another universal joint 34. The axis of linear actuator 42 is spaced substantially away from the main longitudinal axis of housing 28, which is generally coincident with the rotational axis of roadwheel 20, to provide the necessary stability to housing 28 during its movement toward and away from roadwheel 20. FIG. 1 illustrates in phantom lines the maximum and minimum diameters for test tire 24 that can be mounted to housing 28 and drawn against or disengaged from roadwheel 20 by actuator 42.

A plurality of load cells 50 are connected along the lengths of tie rods 30 and 32 and the piston end of actuator 42 for the purpose of measuring tension or compression variations along the connecting links, i.e., 30, 32 and 42, between frame 12 and housing 28 due to the rolling engagement between test tire 24 and roadwheel 20. The tie rods 30 and 32 provide for maximum stiffness when tire 24 is rotatably engaged against roadwheel 20 because of the universal joint connections 34 which prevent bending moments from being applied to the tie rods, and therefore, only tension and compression forces are applied to the tie rods. Since the tie rods are strongest in tension or compression, they provide maximum stiffness against loads applied to housing 28 while requiring the least amount of mass.

As shown in FIG. 2, the horizontal tie rods 32 are positioned in a trapezoidal configuration so as to have an instant center of rotation on the open face side, i.e., unsupported side, of the tire. As tire 24 is drawn against roadwheel 20, its outer surface 52 forms an acute angle with respect to the outer surface 54 of roadwheel 20, as illustrated in FIG. 2. This angle or precamber compensates for the amount of elastic deformation that occurs in the structural components, e.g., spindle 26, during the loading of tire 24 against roadwheel 20. Thus, the present construction, including the trapezoidal or nonparallel horizontal tie rods 32, provides compensation such that parallel alignment between the tire and roadwheel supports is maintained after the tire is fully loaded against the roadwheel.

The yokes 56 which connect universal joints 34 to vertical support structure 40 are adjustable as indicated by the arrows in FIG. 2 to permit variable trapezoidal shapes to be formed with links 32. For a given trapezoidal configuration, the acute angle between outer surfaces 52 and 54 is less for smaller tires and more for larger tires which is desirable because the smaller tires are lightly loaded, i.e., less elastic deformation in the structural components supporting the tire, whereas the larger tires are more heavily loaded, i.e., more elastic deformation in the structural components supporting the tire. This variable compensation for different sized tires cannot be accomplished with parallel linkages because any precambered configuration would be constant throughout its range of travel.

It will be obvious to those skilled in the art that modifications can be made to the present construction without departing from the spirit and scope of the present invention, which is defined by the claims as follows.

I claim:

1. An apparatus for testing tires at high speed comprising:
   a rotatable wheel having an outer surface, means for supporting said wheel on a frame, and means for driving said wheel;
   a tire mounting means connected to a housing for rotatably mounting a test tire having an outer surface, and means for moving said housing and test tire toward and away from said wheel; and
   means for supporting said housing such that during movement of said test tire toward said wheel an acute angle is formed between the outer surface of said test tire and the outer surface of said wheel when the test tire initially engages the wheel, and said means for supporting said housing providing for a variable acute angle being formed between the outer surfaces of said wheel and test tire depending upon the diameter of the test tire;
   wherein said means for supporting said housing includes members which are connected between the frame and the housing and wherein said members are arranged in a nonparallel relationship with respect to each other;
   wherein said members, housing, and frame form a trapezoid; and
   wherein said members are connected to the housing and the frame by means of universal joints.

2. The apparatus as defined in claim 1 wherein the universal joint connections between said members and said frame are adjustable along said frame to vary the trapezoidal configuration that is formed between said members, housing and frame.

3. The apparatus as defined in claim 1 wherein said housing is connected to said frame by means of members that form a nonparallel four-bar linkage connection between said frame and said housing and wherein said members are connected to said housing and to said frame by means of universal joints.

4. An apparatus for testing tires at high speed comprising:

a rotatable wheel having an outer surface, means for supporting said wheel on a frame, and means for driving said wheel;

a tire mounting means connected to a housing for rotatably mounting a test tire having an outer surface, and means for moving said housing and test tire toward and away from said wheel; and means for supporting said housing such that during movement of said test tire toward said wheel an acute angle is formed between the outer surface of said test tire and the outer surface of said wheel when the test tire initially engages the wheel, and said means for supporting said housing providing for a variable acute angle being formed between the outer surfaces of said wheel and test tire depending upon the diameter of the test tire;

wherein said housing being connected to said frame by means of first and second members with said first members being connected between the frame and the underside of said housing and the second members being connected between the frame and a side of said housing; and wherein said first and second members connected to said housing and said frame by means of universal joints whereby only tension and compression forces are applied to said members when said test tire is rotatably engaged against said wheel and said first members forming a four-bar linkage connection between said frame and the underside of said housing and said second members forming a nonparallel four-bar linkage connection between the frame and the side of said housing.

5. The apparatus as defined in claim 4 wherein said second members, frame, and housing forming a trapezoid between the frame and the side of the housing.

6. The apparatus as defined in claim 5 wherein each of said members and said actuator means including load cells positioned for measuring tension or compression variations in response to rolling engagement between the test tire and wheel.

* * * * *